STEREOPHONIC TRANSMISSION SYSTEM FOR TELEVISION BROADCASTING

Filed Nov. 4, 1958

INVENTOR.
ALFRED C. MATTHEWS
BY Robert D. Sanborn
ATTORNEY 3,071,643
Patented Jan. 1, 1963

3,071,643

STEREOPHONIC TRANSMISSION SYSTEM FOR TELEVISION BROADCASTING

Alfred C. Matthews, Huntingdon Valley, Pa., assignor, by mesne assignments, to Philco Corporation, Philadelphia, Pa., a corporation of Delaware Filed Nov. 4, 1958, Ser. No. 771,815
14 Claims. (Cl. 178—5.6)

The present invention relates to stereophonic signal transmission systems, and more particularly to time-multiplex stereophonic signal transmission systems for television broadcasting or the like.

It is now well known that stereophonic sound produces a more pleasing sensation for the listener than monophonic sound of the same or wider frequency range. It has been found, for example, that stereophonic sound having a frequency spectrum of zero to 7500 cycles per second in each channel is preferable to monophonic sound having a frequency spectrum of zero to 15,000 cycles per second.

Various systems have been proposed for broadcasting stereophonic program signals either for straight radio reception or as the sound portion of a television program. In one system which has been employed in the past to provide stereophonic transmission of the sound portion of a television program, one of the two stereophonic program signals is transmitted as the sound portion of the composite television signal. The other stereophonic program signal is then broadcast by way of a cooperating AM or FM radio station. This dual channel system has the obvious disadvantage that both a television transmitter and a separate radio transmitter are required in order to transmit the entire program material. Similarly, a home television receiver and a separate radio receiver are required at each receiving location. Differences in the signal transmission and reception characteristics of the television channel and the radio channel will give rise to annoying distortions in stereophonic reproduction. In addition, the system is not truly compatible since neither a television receiver nor a radio receiver operating by itself will receive the complete sound information.

Various forms of single-channel stereophonic broadcasting systems have been proposed. Some systems are compatible with existing monophonic receivers and some are not. Previously proposed single-channel systems employ single sideband transmission, subcarrier (i.e. frequency division multiplex) or multiplex by way of quadrature phased carriers. In all of these systems narrow band filters, phase detectors or some equivalent means must be provided for deriving reference demodulation signals. These circuits or circuit elements add to the cost and complexity of the stereophonic receiver.

Therefore it is an object of the present invention to provide an inexpensive, compatible, single-channel stereophonic sound system for television broadcasting.

It is a further object of the present invention to provide a stereophonic sound system for television transmitters and receivers which requires a minimum of additional equipment at the transmitter and at the receiver.

Another object of the invention is to provide a novel, integrated sound and video transmitting and receiving system for broadcasting both video and stereophonic sound information.

A more specific object of the present invention is to provide a time division multiplex sound system for television broadcasting systems which does not require the transmission of a separate demodulating reference signal.

In general these, and other objects of the present invention which will appear as the description of the invention proceeds, are achieved by employing a time division multiplex sound transmitting system in which the horizontal synchronizing pulses of the video signal serve as the reference signal for the time multiplex system in the sound channel both at the transmitter and at the receiver.

For a better understanding of the present invention, together with other and further objects thereof, reference should now be made to the following detailed description which is to be read in conjunction with the accompanying drawings in which.

Figure 1:
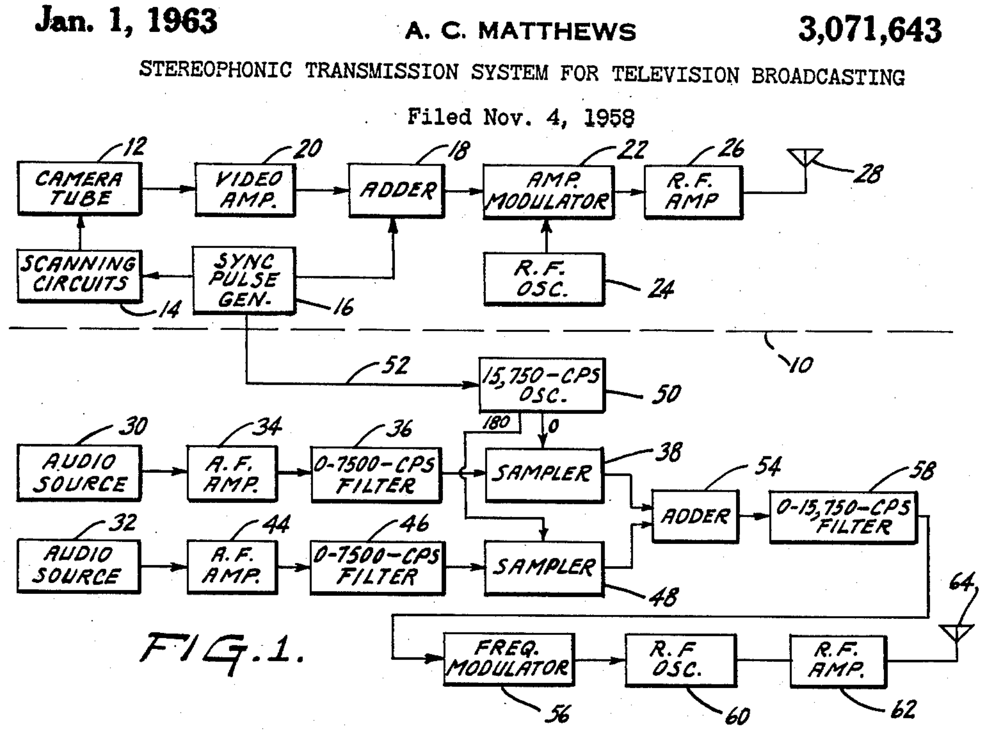
FIG. 1 is a block diagram of a television transmitter arranged in accordance with the present invention.

In the television transmitter system of FIG. 1 the video channel is shown above the broken line 10 and the sound transmission channel is shown below broken line 10. The video section of the embodiment of the invention chosen for illustration in FIG. 1 is conventional. It comprises a camera tube 12 which is supplied with proper scanning voltages from scanning circuits 14. The operation of the scanning circuits 14 is controlled by synchronizing pulses supplied by synchronizing pulse generator 16. The synchronizing signals from generator 16 are supplied to an adder circuit 18 where they are combined with the video signals received from camera tube 12 by way of video amplifier 20. The output of adder 18 is connected to the modulation input of an amplitude modulator 22 which receives a carrier frequency signal from radio frequency oscillator 24. The output circuit of amplitude modulator 22 is connected through radio frequency amplifier 26 to the transmitting antenna 28.

The stereophonic sound system shown below the broken line 10 of FIG. 1 comprises two sources of sound information signals 30 and 32. Sources 30 and 32 may be microphones suitably placed for stereophonic pickup of live programs or they may be any of the well known transducers which convert recorded stereophonic sound information signals into corresponding electrical signals representative of the recorded material.

The signal from source 30 is supplied through a suitable amplification stage 34 and low pass filter 36 to an input of sampler circuit 38. For reasons which will appear later, filter 36 should have an upper cut-off frequency equal to approximately one-half the sampling frequency employed in the multiplex system. Similarly the output signal of source 32 is supplied through audio frequency amplifier 44 and filter 46 to a second sampler 48. It is to be understood that amplifier 34 and filter 36 may be replaced by an amplifier of limited passband which performs the functions of the two units it replaces. Amplifier 44 and filter 46 may be similarly combined.

Samplers 38 and 48 are circuits which provide an output signal which is proportional at certain selected times to the instantaneous amplitude of an information signal supplied to the input thereof. The selected times at which the output signal is proportional to the input signal is controlled by a sampling signal supplied by a sampling oscillator 50. Samplers of this type are employed in many commercial pulse-amplitude-modulated, time-division-multiplex, point-to-point communication systems. Although the use of a narrow sampling pulse has certain known advantages, it lies within the scope of the present invention to employ a sampling waveform other than a pulse waveform, for example a sine wave or a square wave. The signal supplied by oscillator 50 to sampler 48 is preferably identical to the signal supplied by the same oscillator 50 to sampler 38 except that it is displaced in time from the signal supplied to sampler 48 by a selected fraction of the period of the sampling signal generated by oscillator 50. A connection 52 is made from synchronizing pulse generator 16 in the video transmitter portion to oscillator 50 in the sound channel in order to cause the oscillator to generate a sampling signal having a frequency exactly equal to the horizontal line frequency of the television transmitter or a multiple thereof and having a phase which bears a predetermined fixed relationship to the phase of the horizontal synchronizing pulses. The term "phase" as applied to non-sinusoidal waveforms refers, of course, to the time displacement of a selected point on one waveform from a selected point on the other waveform.

The sampled sound information signals appearing at the outputs of samplers 38 and 48, respectively, are supplied to the two signal inputs of a linear adder circuit 54. The composite sound information signal appearing at the output of adder 54 is supplied to a frequency modulator 56 through a low pass filter 58. For reasons which will appear presently, filter 58 should have a cut-off frequency which is approximately equal to the sampling frequency employed in the system. Modulator 56 together with carrier frequency oscillator 60 provide a signal at the sound carrier frequency assigned to the transmitter. This signal is a frequency modulated signal carrying the composite sound information. Oscillator 60 is connected through the radio frequency power amplifier 62 to the antenna 64 of the sound channel. Although two separate antennas 28 and 64 have been shown in FIG. 1, it is to be understood that the signals from amplifiers 26 and 62 may be supplied to a single antenna in accordance with conventional commercial practice if desired. Also the positions of filter 58 and adder 54 may be interchanged if desired.

As stated above, the video portion of the transmitter of FIG. 1, shown above the broken line 10, is conventional and, for this reason, no detailed description of its operation will be given. The sound channel, which is shown below line 10, operates as follows. The signals at the output of filters 36 and 46, which are also the input signals to samplers 38 and 48, are complex audio frequency signals corresponding to the signals supplied by sources 30 and 32 except that any frequency components above the cut-off frequency of filters 36 and 46 are attenuated by these filters.

Figure 3:
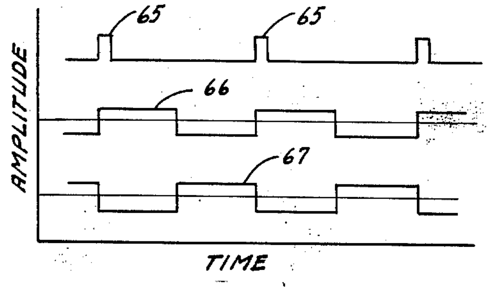
FIG. 3 is a series of waveforms on a common time scale which illustrate the operation of the systems of FIGS. 1 and 2.

FIG. 3 is a plot showing the horizontal synchronizing pulses 65 which are supplied to oscillator 50 to control the phase and frequency of the signal generated thereby. Waveforms 66 and 67 represent the sampling signals supplied by oscillator 50 to samplers 38 and 48, respectively. In order to simplify the description of the operation of the transmitter of FIG. 1 it will be assumed that sampling waveforms 66 and 67 are symmetrical square waves and that samplers 38 and 48 will pass signals only on the positive half cycles of these waveforms. In actual practice, however, narrow sampling pulses corresponding in time to a selected portion of the square waves, for example, the leading edges of the positive half cycles, may be employed instead of the symmetrical square waves 66 and 67.

From FIG. 3 it will be seen that sampler 38 will pass a signal for a selected period of time immediately following each synchronizing pulse 65, this period being less than the time interval between pulses 65. At some time following the time at which sampler 38 becomes inactive but before the next occurring pulse 65 sampler 48 is caused to pass a signal derived from source 32. Samplers 38 and 48 continue to conduct alternately at the frequency of pulses 65 (or some selected multiple thereof) thus producing two sets of interleaved sample signals at the output of adder 54. It can be shown that the composite audio signal at the output of adder 54 includes components in the frequency range from zero to the sampling frequency which represent the intelligence supplied by the signals from filters 36 and 46. In addition, the signal at the output of adder 54 includes components at multiples of the sampling frequency and at certain sidebands thereof. Filter 58 removes these higher frequency components which represent only redundant information.

It can be shown that a sampling frequency equal to twice the highest frequency component of the signal to be transmitted is required if there is to be no loss of intelligence in the transmitted signal. It can be shown also that limiting the signal supplied to the sampler to one-half the sampling frequency tends to minimize cross-talk between the channels. It is for these reasons that filters 36 and 46 have an upper cut-off frequency equal to one-half the sampling frequency and that filter 58 has an upper cut-off frequency equal to the sampling frequency. In the example chosen for illustration in FIG. 1 it is assumed that the sampling frequency is equal to the horizontal line scanning frequency which is 15,750 cycles per second under commercial broadcasting standard. Therefore filters 36 and 46 will have upper cut-off frequencies of approximately 7,500 cycles per second, and filter 58 will have an upper cut-off frequency of approximately 15,750 cycles per second.

The composite sound information signal appearing at the output of filter 58 frequency modulates the signal supplied by oscillator 60 and the modulated sound carrier is broadcast in the usual manner.

The portion of the composite sound information signal lying below one-half the sampling frequency may be received by a conventional monophonic television receiver as a signal which approximates the summation of the two signals supplied by sources 30 and 32. Thus the system shown in FIG. 1 is compatible with existing monophonic television receivers.

Figure 2:
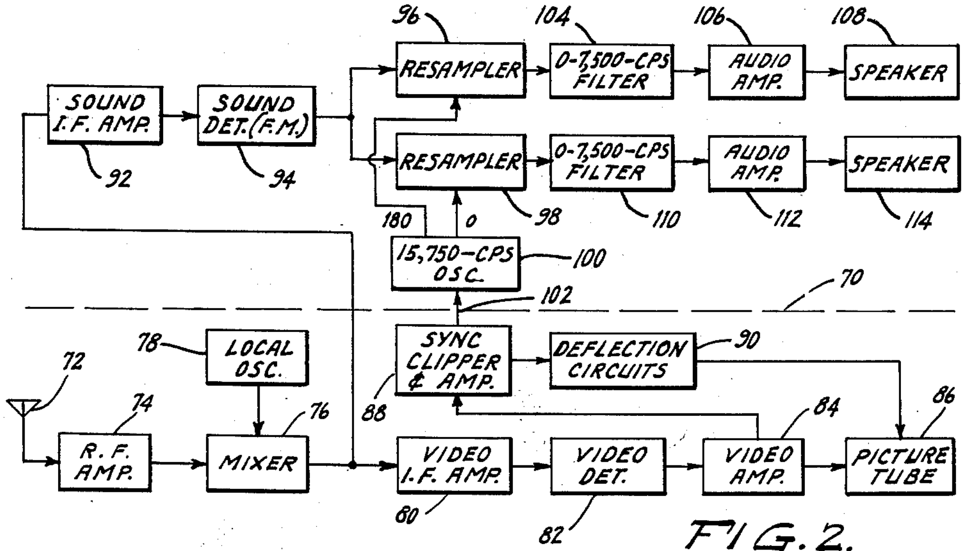
FIG. 2 is a block diagram of a television receiver arranged in accordance with the present invention.

FIG. 2 is a block diagram of a television receiver, arranged in accordance with the present invention, which will provide stereophonic reception of the sound signal transmitted by the circuit of FIG. 1. The video and sweep portions of the receiver shown below the broken line 70 in FIG. 2 are in accordance with commercial home television receiver practice. The signal received by an antenna 72 is supplied through suitable amplifier circuit 74 to one input of a heterodyne mixer 76. Mixer 76 receives a second signal from a tunable local oscillator 78. The heterodyne signal appearing at the output of mixer 76 is supplied through intermediate frequency amplifier 80 to the video channel detector circuit 82. The detected video signal from circuit 82 is supplied by way of video amplifier 84 to picture tube 86 and to the synchronizing signal separation circuit 88. Signals from circuit 88 are supplied to deflection circuit 90 in the usual fashion to control the generation of the horizontal and vertical deflection signals. These deflection signals from circuit 90 are supplied to the picture tube 86.

The output of mixer 76 is connected also to the input of the stereophonic sound channel shown above broken line 70 in FIG. 2. In the embodiment of the invention shown in FIG. 2 this channel includes a sound intermediate frequency amplifier 92 and a frequency modulation sound detector or discriminator 94. The output of detector 94 is connected to an input of each of two resamplers 96 and 98. Again, resamplers 96 and 98 may be circuits of the type employed in pulse amplitude-modulated, time-division-multiplex receiver systems for separating individual channels from the composite time-multiplex audio signal.

An oscillator 100 supplies appropriately phased sampling signals to the resamplers 96 and 98. A connection 102 for oscillator synchronizing signals is provided from the synchronizing signal separation circuit 88 to oscillator 100.

The output signal of resampler 96 is supplied through a low pass filter 104 and audio amplifier 106 to one speaker system 108. Similarly the output of resampler 98 is supplied through filter 110 and audio amplifier 112 to a second speaker system 114. It is to be understood that speaker systems 108 and 114 will be spaced an appropriate distance apart to give the listener the desired stereophonic effect. It is to be understood also that filter 104 may be combined with an amplifier 106 and that filter 110 may be combined with amplifier 112. Filters 104 and 110 preferably have an upper cut-off frequency approximately equal to one-half the sampling frequency at the transmitter. This limits undesirable crosstalk which may be present in the output of resamplers 96 and 98 while at the same time passing all of the sound intelligence passed by filters 36 and 46 at the transmitter.

The portion of the receiver system shown in FIG. 2 which lies below the broken line 70 is identical in its arrangement to circuits currently employed in commercial home television receivers. Therefore no detailed description of the operation of this portion of the receiver of FIG. 2 will be given.

The operation of sound intermediate frequency amplifier 92 and sound detector 94 is the same for the circuit of FIG. 2 as it is for similar elements in a conventional home television receiver.

Oscillator 100 supplies sampling signals to resamplers 96 and 98 to cause first one of these circuits and then the other to pass a signal. Resampler 96, for example, is caused to pass a signal to filter 104 at a time in which the portion of the signal passed by sampler 38 is being supplied by detector 94 or, more correctly, when the signal passed by sampler 48 has an amplitude of zero at the output of detector 94. Similarly resampler 98 is caused to pass a signal at times corresponding to the times at which the signal supplied by sampler 38 has zero amplitude at the output of detector 94 and the signal passed by sampler 48 has a value other than zero. As indicated by the foregoing, and as is well known in the time multiplex art, the sampling frequency supplied to resamplers 96 and 98 must have exactly the same frequency as the sampling signal at the transmitter (or a submultiple thereof) and it must have a phase which is directly related to the phase of the sampling signal at the transmitter. The necessary correspondence between the sampling times at the transmitter and the resampling times at the receiver is achieved by synchronizing both the sampling oscillator 50 at the transmitter and the oscillator 100 at the receiver with the horizontal synchronizing pulses which are included in the composite video signal for the purpose of synchronizing the horizontal line scanning rate at the receiver picture tube 86 with the horizontal line scanning rate at the camera tube 12. Since circuits for generating the horizontal synchronizing pulses, adding these pulses to the composite video signal and then extracting them from the composite video signal at the receiver are necessary in monophonic television transmitters and receivers for the reasons just stated, sampling phase information for stereophonic sound reception is provided at the receiver without adding any reference generating circuit at the transmitter and without requiring any separate phase reference determining circuits at the receiver. The use of the horizontal synchronizing pulses as the phase reference signal for the time-multiplex circuits in the sound channel saves equipment at the transmitter and at each receiver, and also saves spectrum space for the sound and video signals which would otherwise be taken up by phase reference information for the multiplex signal.

As mentioned above, filters 104 and 110 remove the sampling frequency and undesired harmonics and sidebands thereof which appear at the output of the resamplers 96 and 98. It should now be clear that the information supplied by sound information source 30 at the transmitter will be supplied to speaker 108 at the receiver but not to speaker 114. Conversely, information supplied by source 32 is supplied to speaker 114 but not to speaker 108.

The receiver shown in FIG. 2 will receive monophonic television signals and supply substantially identical audio signals to speakers 108 and 114. It has been found that the reproduction of a monophonic signal by two spaced speaker systems is much more pleasing than the reproduction of the same signal by a single speaker system.

While the invention has been described with reference to the preferred embodiments thereof, it will be apparent that various modifications and other embodiments thereof will occur to those skilled in the art within the scope of the invention. Accordingly I desire the scope of my invention to be limited by the appended claims.

It is claimed that:

1. A television receiver including means for receiving a composite television signal, means for separating horizontal synchronizing pulses from said composite television signal, a time multiplex sound channel, means responsive to said separated horizontal synchronizing pulses for deriving demultiplexing signals for said time multiplex sound channel from said separated horizontal synchronizing pulses, and means for supplying said derived demultiplexing signals to said time multiplex sound channel.

2. In a television receiver including means for receiving a composite television signal, means for separating said composite television signal into a sound information signal and a video information signal and means for separating horizontal synchronizing pulses from said video information signal, a stereophonic sound channel comprising first and second sound reproducers, first and second amplifying and frequency limiting means coupled to said first and second sound reproducers, respectively, resampler means, means for supplying said separated sound information signal to said resampler means, means for supplying said separated horizontal synchronizing pulses to said resampler means, means coupling said resampler means to said first and second amplifying and frequency limiting means, said resampler means being responsive to said separated sound information signal and said separated horizontal synchronizing pulses for supplying time spaced samples of said separated sound information signal which occur in a first time relationship to said separated horizontal synchronizing pulses to said first amplifying and frequency limiting means and for supplying sample signals of said separated sound information signal which occur in a second time relationship to said separated horizontal synchronizing pulses to said second amplifying and frequency limiting means.

3. In a television receiver including means for receiving a composite television signal, means for separating said composite television signal into a sound information signal and a video information signal and means for separating horizontal synchronizing pulses from said video information signal, a stereophonic sound channel comprising means for generating first and second differently phased resampling reference signals, first and second amplifying and frequency limiting means, means for supplying said separated horizontal synchronizing pulses to said reference signal generating means to control the phase and frequency of said resampling reference signals, first and second sound reproducers coupled with the output of said first and second amplifying and frequency limiting means, respectively, first resampler means, means for supplying said separated sound information signal and said first resampling reference signal to said first resampler means, means coupling the output of said first resampler means to the input of said first amplifying and frequency limiting means, said first resampler means being responsive to said separated sound information signal and said first resampling reference signal for supplying time spaced samples of said separated sound information signal to said first amplifying and frequency limiting means, and second resampler means, means for supplying said separated sound information signal and said second resampling reference signal to said second resampler means, means coupling the output of said second resampler means to the input of said second amplifying and frequency limiting means, said second resampler means being responsive to said separated sound information signal and said second resampling reference signal for supplying time spaced samples of said separated sound information signal to said second amplifying and frequency limiting means.

4. In a television receiver including means for receiving a composite television signal, means for separating said composite television signal into a sound information signal and a video information signal, and means for separating horizontal synchronizing pulses from said video information signal, a stereophonic sound channel comprising means for generating first and second differently phased resampling reference signals, means for supplying said separated horizontal synchronizing pulses to said resampling reference signal generating means to control the phase and frequency of said resampling reference signals, said two resampling reference signals having the same frequency, first and second low pass filter means having a cutoff frequency approximately equal to one-half the frequency of said first and second resampling reference signals, first resampling means, means for supplying said separated sound information signal to said first resampling means, means for supplying said first resampling reference signal to said first resampling means, means coupling the output of said first resampling means to said first filter means, said first resampling means being responsive to said separated sound information signal and said first resampling reference signal for supplying time spaced samples of said separated sound information signal to said first filter means, second resampling means, means for supplying said separated sound information signal to said second resampling means, means for supplying said separated horizontal synchronizing pulses to said second resampling means, means coupling the output of said second resampling means to said second filter means, said second resampling means being responsive to said separated sound information signal and said second resampling reference signal for supplying a second series of time spaced samples of said separated sound information signal to said second filter means, first and second speaker systems, means coupling the output of said first filter means to said first speaker system and means coupling the output of said second filter means to said second speaker system.

5. A television system in accordance with claim 4 wherein said first and second resampling reference signals have a frequency substantially equal to the repetition frequency of said horizontal synchronizing pulses, and wherein said first and second resampling reference signals are separated in phase by approximately one-half cycle.

6. A television transmitter including means for generating a signal having a frequency equal to an integral multiple of the repetition frequency of the horizontal synchronizing pulses, a time multiplex sound transmission channel, means for supplying said generated signal to said sound transmission channel and means in said sound transmission channel for deriving demultiplexing signals for said multiplex sound transmission channel from said generated signals supplied thereto.

7. I a television transmitter including means for generating a signal having a frequency equal to an integral multiple of the pulse repetition frequency of the horizontal synchronizing pulses, a time-division-multiplex stereophonic sound channel comprising first and second sources of sound information signals, sampling means coupled to said first and second sources and means for supplying said generated signals to said sampling means, said sampling means selecting differently phased time spaced samples of said sound information signals provided by said first and second sources respectively, and adder means coupled to said sampling means for linearly combining said samples of information signals into a single composite sound information signal.

8. In a television transmitter including means for generating horizontal synchronizing pulses, a time-division-multiplex stereophonic sound channel comprising first and second sources of sound information signals, sampling means coupled to said first and second sources and to said means for generating horizontal synchronizing pulses for selecting time spaced samples of said information signals provided by said first and second sources which bear a predetermined time relationship to the times at which said horizontal synchronizing pulses are generated, said samples of said sound information signal from said first source being taken at different times than the samples of said sound information signal from said second source, and adder means coupled to said sampling means for linearly combining said samples of sound information signals from said first and second sources into a single composite sound information signal.

9. In a television transmitter including means for generating horizontal synchronizing pulses, a time-division-multiplex stereophonic sound channel comprising first and second sampler circuits, a first source of limited-band-width sound information signals coupled to an input of said first sampler circuit, a second source of limited-band-width sound information signals coupled to an input of said second sampler circuit, a source of two differently phased sampling signals coupled to said first and second sampler circuits, said source providing a sampling signal of one phase to said first sampler circuit and a sampling signal of a different phase to said second sampler circuit, means providing a synchronizing signal connection from said means for generating horizontal synchronizing pulses to said source of sampling signals, means for additively combining the output signals of said first and second sampler circuits and means coupled to said combining means for broadcasting components of said additively combined signals which lie in a selected frequency band.

10. In a television transmitter including means for generating horizontal synchronizing pulses, a time-division-multiplex stereophonic sound channel comprising first and second sources of sound information signals, first and second sampler circuits, a source of two differently phased sampling reference signals coupled to said first and second sampler circuits, said source providing a sampling signal of one phase to said first sampler circuit and a sampling signal of a different phase to said second sampler circuit, means providing a synchronizing signal connection from said means for generating horizontal synchronozing pulses to said source of said sampling reference signals, first low pass filter means coupling said source of sound information signals to said first sampler circuit, second low pass filter means coupling said second source of sound information signal to said second sampler circuit, means for additively combining the output signals of said first and second sampler circuits and third low pass filter means coupled to the output of said adder means, said first and second filter means having a cutoff frequency approximately equal to one-half the frequency of said sampling reference signals and said third filter means having a cutoff frequency approximately equal to the frequency of said sampling reference signals.

11. A television system including a transmitter and a receiver, said transmitter including first means for generating and transmitting horizontal synchronizing pulses, said receiver including second means for receiving said transmitted horizontal synchronizing pulses, said transmitter further comprising a dual channel, time-division-multiplex, sound transmitting channel, and timing signal generating means coupled to said first means for deriving timing signals for said sound transmitting channel from said generated horizontal synchronizing pulses, and said receiver further comprising a time-division-multiplex sound receiving channel including timing signal generating means coupled to said second means for deriving timing signals for said sound receiving channel from said received horizontal synchronizing pulses.

12. In a television system including means for generating, transmitting and receiving horizontal synchronizing pulses, first and second sources of sound information signals, means responsive to said generated horizontal synchronizing pulses for producing first and second differently phased sampling signals, first sampling means responsive to sound information signals from said first source and said first sampling reference signal for producing a first sampled sound information signal, second sampling means responsive to sound information signals from said second source and said second sampling reference signal for producing a second sampled sound information signal, adder means for linearly combining said first and second sampled sound information signals to form a composite sound information signal, means responsive to receive horizontal synchronizing pulses for generating first and second differently phased resampling reference signals, first and second amplifying and frequency limiting circuits, first resampling means responsive to said composite sound information signal and said first resampling reference signal for supplying an input signal to said first amplifying and frequency limiting circuit, second resampling means responsive to said composite sound information signal and said second resampling reference signal for supplying an input signal to said second amplifying and frequency limiting circuit, and first and second sound reproducers responsive to the outputs of said first and second amplifying and frequency limiting circuits, respectively.

13. In a television system including means for generating, transmitting and receiving horizontal synchronizing pulses, first and second sources of sound information signals, first and second sampler circuits, a source of two differently phased sampling signals coupled to said first and second sampler circuits, said source providing a sampling reference signal of one phase to said first sampling circuit and a sampling reference signal of a different phase to said second sampling circuit, said two sampling signals having a frequency equal to a multiple of the repetition frequency of said horizontal synchronizing pulses, a first low pass filter means coupling said first source of sound information signals to said first sampler circuit, a second low pass filter means coupling said second source of sound information signals to said second sampler circuit, adder means for linearly combining the output signals of said first and second sampler circuits, a third low pass filter means coupled to the output of said adder means, for filtering the composite sound information signal provided by said adder means, means responsive to said received horizontal synchronizing pulses for generating first and second differently phased resampling reference signals, a first resampling circuit responsive to said filtered composite sound information signal and said first resampling reference signal, a second resampling circuit responsive to said filtered composite sound information signal and said second resampling reference signal, first and second spaced speaker systems, means including a fourth low pass filter means coupling the output of said first resampler circuit to said first speaker system, and means including a fifth low pass filter means coupling the output of said second resampling circuit to said second speaker system, said first and second filter means having a cutoff frequency equal to approximately one-half the frequency of said sampling reference signals, said third low pass filter having a cutoff frequency equal to approximately the frequency said sampling reference signals and said fourth and fifth filter means having a cutoff frequency approximately equal to one-half the frequency of said resampling reference signals.

14. A television system including a transmitter and a receiver, said transmitter including first means for generating and transmitting horizontal synchronizing pulses, said receiver including second means for receiving said transmitted horizontal synchronizing pulses, said transmitter further comprising a dual channel, time-division-multiplex, sound transmitting channel, and first timing signal generating means coupled to said first means for deriving two oppositely phased symmetrical square wave timing signals for said sound transmitting channel from said generated horizontal synchronizing pulses, and said receiver further comprising a time-division-multiplex sound receiving channel including second timing signal generating means coupled to said second means for deriving two oppositely phased symmetrical square wave timing signals for said sound receiving channel from said received horizontal synchronizing pulses.

References Cited in the file of this patent

UNITED STATES PATENTS

| | | |
|---|---|---|
| 2,089,639 | Bedford | Aug. 10, 1937 |
| 2,566,700 | Goldsmith | Sept. 4, 1951 |
| 2,851,532 | Crosby | Sept. 9, 1958 |
| 2,851,617 | Walker | Sept. 9, 1958 |
| 2,878,316 | Boothroyd | Mar. 17, 1959 |